Figures 1, 3:
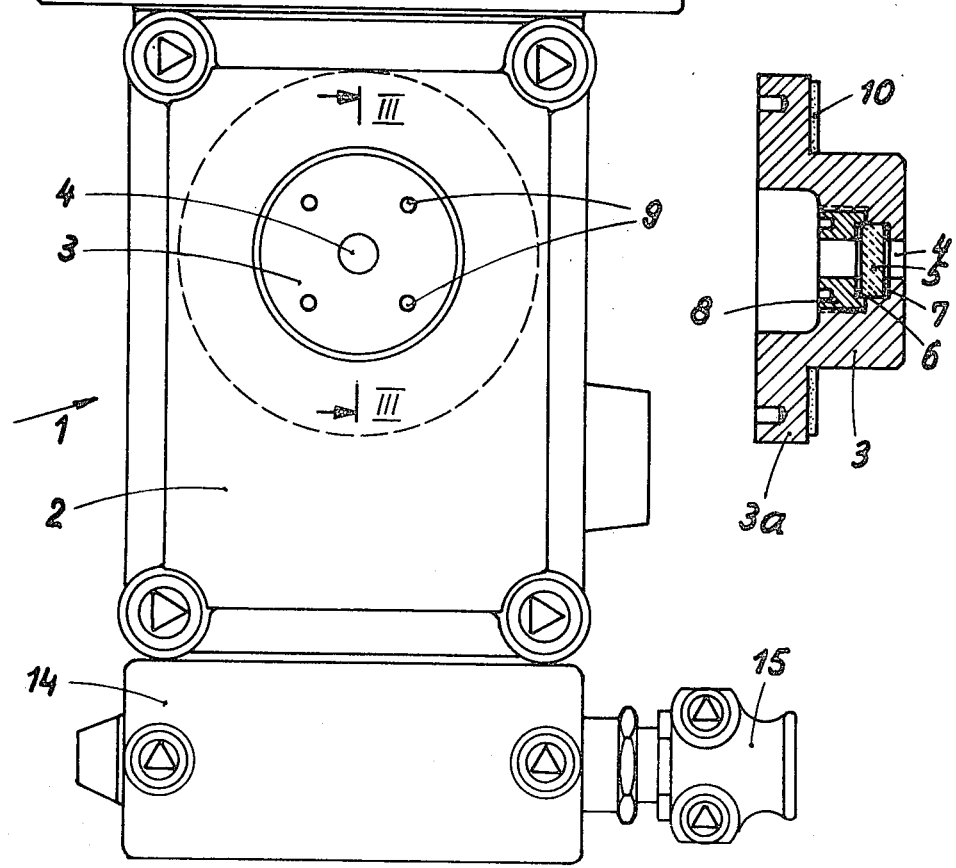

United States Patent [19]

Kugler

[11] 4,169,379

[45] Oct. 2, 1979

[54] TEMPERATURE MEASURING DEVICE FOR NON-CONTACTING TEMPERATURE MEASUREMENT

[76] Inventor: Hans C. Kugler, Bruchwiesen-Anlage 1, Saarbrucken-Dubweiler, Fed. Rep. of Germany, 6602

[21] Appl. No.: 877,823

[22] Filed: Feb. 15, 1978

[51] Int. Cl.² ............................................. G01J 5/04
[52] U.S. Cl. ................................... 73/355 R; 73/431
[58] Field of Search ............. 73/355 R, 355 EM, 431; 350/1.1

[56] References Cited

U.S. PATENT DOCUMENTS

| 2,565,249 | 8/1951 | Machler | 73/355 EM |
| 2,994,053 | 7/1961 | Waard | 350/1.1 |
| 3,118,063 | 1/1964 | Kaufman | 350/1.1 |
| 3,584,509 | 6/1971 | Compton | 73/355 R |

Primary Examiner—Donald O. Woodiel
Attorney, Agent, or Firm—John J. Dennemeyer

[57] ABSTRACT

A temperature measuring device for non-contacting temperature measurement includes a radiation pyrometer, located in a pressure-resistant housing. Power cables connect with said housing through pressure-resistant openings. The wall of the housing located optically in front of the radiation pyrometer is provided with a removable insert in which is formed a radiation inlet. A germanium disc is mounted as a window in said inlet.

4 Claims, 3 Drawing Figures

TEMPERATURE MEASURING DEVICE FOR NON-CONTACTING TEMPERATURE MEASUREMENT

The invention relates to a temperature measuring device for non-contacting temperature measurement by means of a radiation pyrometer, which receives the temperature-dependent infrared radiation emitted by the object of measurement and converts it into an output voltage, which is supplied to an indicating instrument. Radiation pyrometers of this type are used mainly for measuring the temperature of objects which are not easily accessible or moving objects and cause no disturbance of the temperature field, as may occur when using heat sensors, which measure the temperature by way of a changing electrical resistance.

The invention deals with the problem of safety in areas subject to the danger of explosions and in underground operations, which is compromised by fire-damp. In these locations, explosions are caused easily due to overheating bearings, conveyor belts, brake drums and the like. Therefore, the new object of the invention is to increase safety in areas subject to the danger of explosions and in underground operations by using non-contacting temperature measurement. This object is fulfilled by a temperature-measuring device for non-contacting temperature measurement by means of a radiation pyrometer, which is located in a pressure-resistant main housing provided with pressure-resistant inlet and outlet openings for the leads, the wall of which housing associated with the optical system of the radiation pyrometer is provided with an insert receiving a germanium disc, which is located in front of the optical system as a radiation inlet window. A temperature-measuring device is thus created with a construction which is resistant to explosions and firedamp, with whose assistance the temperature of machine parts, pipe lines etc. can be monitored, which could cause explosions due to inadmissible heating. As shown, an additional intrinsically safe ancillary device could be associated with the radiation pyrometer, in order, upon the occurrence of inadmissibly high temperatures, to produce warning signals for example by way of monitoring limit values and remote control or even to switch-off machine devices automatically. Since a radiation pyrometer already responds to the thermal radiation of a human body, the temperature measuring device according to the invention can also be used as a barrier, so that in underground operations for example, miners are prevented from using the conveyor belts as transport means for themselves, which has already caused numerous accidents.

In contrast to a glass disc, a germanium disc in the radiation inlet has the advantage of substantially increased material density and also allows the infrared thermal radiation to pass virtually unhindered. In its seat in the insert, which is naturally likewise connected to the housing wall, for example the housing cover, associated therewith in a non-penetrable manner, the germanium disc is appropriately covered on both sides with sealing rings and housed by a screw-threaded thrust ring.

If a commercially available pressure-resistant cast housing suitable for receiving the radiation pyrometer is selected as the main housing, as is available for housing indicators and switchgear in a construction resistant to explosions and firedamp, with a simple glass disc as the sight glass, an instrument housing receiving an indicator is attached to the main housing, in which instrument housing electrical connections in the form of connection terminals leaving the main housing end, the electrical output circuit of the radiation pyrometer, located in the main housing, being designed, as regards its measured value output connected to the connecting terminals, with a limitation of its short-circuit current intensity to a maximum of 50 milli-amperes. With such a low short-circuit current intensity, the instrument housing does not need to be produced with a construction resistant to explosions and firedamp, since the formation of a spark is impossible with such a short-circuit current intensity.

When, as regards the pressure-resistant openings for the inlet and outlet of leads, the main housing is not suitable for introducing the mains cables directly, a pressure-resistant mains junction box with pressure-resistant openings for the inlet and outlet of leads is provided, which box is attached to the main housing.

Figure 2:
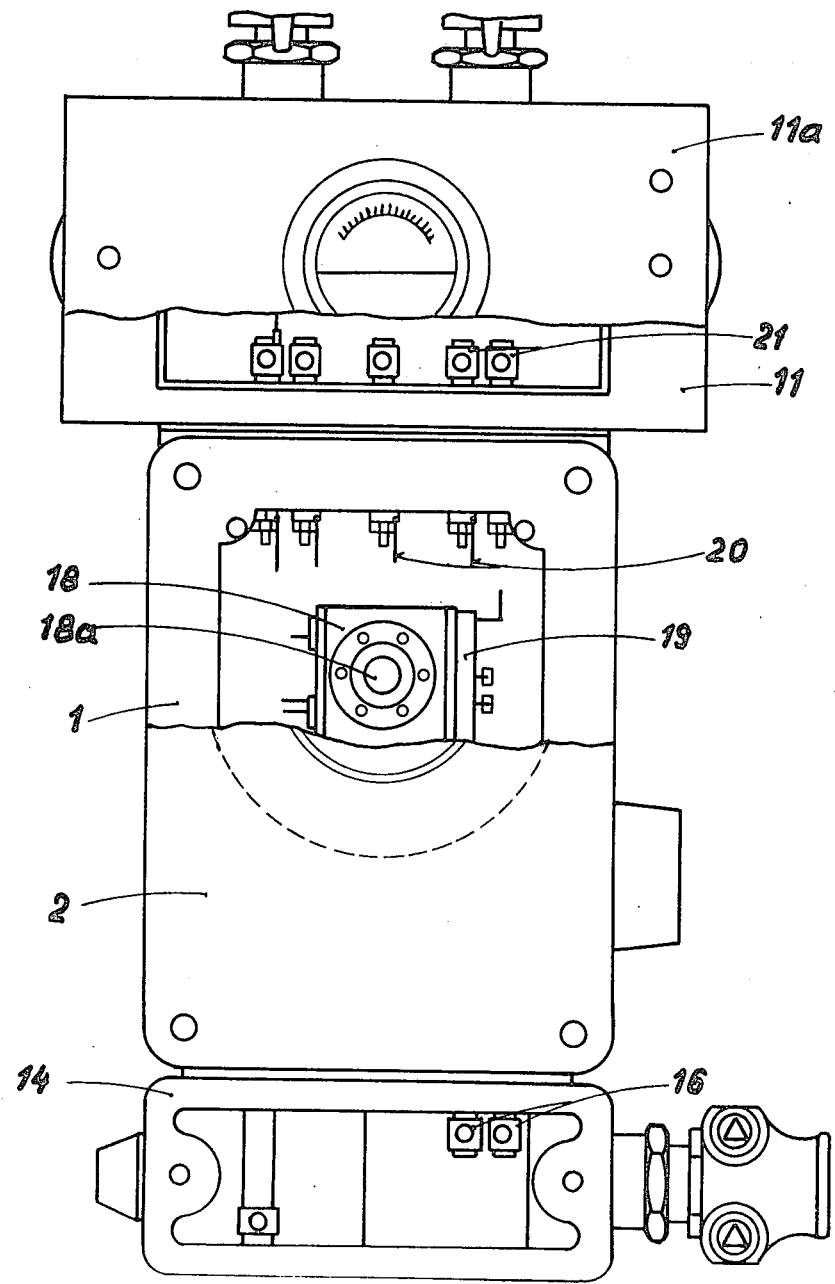

One embodiment of a temperature-measuring device according to the invention is illustrated in the drawings and in particular FIG. 1 is a front view of the device consisting of three housings, FIG. 2 is a front view according to FIG. 1 with the front walls cut partly away or with the front wall removed and FIG. 3 is a section through the insert with the germanium disc on line III—III of FIG. 1.

FIG. 1 shows the central main housing 1 with the front cover 2 which comprises an opening, from which the insert 3 provided with a radiation inlet 4 projects. A germanium disc 5 is located in the radiation inlet 4 as a radiation window, which is covered with two sealing rings 6 and 7 and clamped in its seat by means of a screw-threaded thrust ring 8 (FIG. 3). The free end face of the insert 3 is provided with four bores 9 for attaching a transparent dust-proof cover.

The insert 3 is screwed by its flange 3a to the rear side of the front wall 2 of the housing, with the interposition of a sealing ring 10. The inner seal 6 on the germanium disc 5 is appropriately a copper seal, whereas the seals 7 and 10 are metal-coated seals. The clearance dimensions both of the screw-thread of the thrust ring 8 as well as of the outer seals 7 and 10 correspond to the VDE specification (Association of German Electrical Engineers) 0170/0171 paragraph 16, 17$d$. According to the latter, the holder for the germanium disc is resistant to the penetration of ignition.

An instrument housing 11 of steel plate is attached to the top of the main housing 1, which housing 11 receives an indicator 12 and is provided with two cable outlets 13, in order to be able to connect ancillary apparatus to the indicator 11. Since the main housing 1 is a commercially available pressure-resistant housing, in this embodiment, a pressure-resistant mains connection box 14 is attached on the underside of the main housing, in which box the mains cable can be introduced through a tension-free cable inlet 15. The introduction (not shown) of the mains cable into the mains junction box 14 is constructed to be pressure-resistant or "intrinsically safe", in the same manner as the inlets in the main housing 1 for the cables coming from the connecting terminals 16 (FIG. 2). To illustrate the terminals 16, the mains junction box 14 is illustrated without its cover in FIG. 2.

FIG. 2 shows the main housing 1 with its front cover 2 partly cut away and the inserted radiation pyrometer 18 with its optical system 18a. A plate 19 is attached to the radiation pyrometer 18, which plate supports the output circuit of the pyrometer consisting of wire-wound resistances and Zener diodes, which circuit is designed to limit the short-circuit current intensity of the commercially available radiation pyrometer 18 to a maximum of 50 milli-amperes. Due to this it is possible to attach the instrument housing 11 in a non-pressure-resistant construction on the upper side of the main housing 1. The signal leads 20 of the output circuit of the radiation pyrometer 18 are guided out of the main housing 1 in a pressure-resistant or intrinsically safe manner and terminate in connection terminals 21 inside the instrument housing 11. Since these terminals 21 carry a maximum short-circuit current intensity of 50 milli-amperes, no sparks nor short-circuit heat can be produced in the instrument housing 11 which is not pressure-resistant, which sparks or heat could cause an explosion or firedamp. To illustrate the terminals 21, the cover 11a of the instrument housing 11 is shown partly cut away in FIG. 2.

What is claimed is:

1. A temperature measuring device for use in locations endangered by explosion or firedamp, comprising:
   a radiation pyrometer for non-contacting temperature measurement, said pyrometer including an electric output circuit having outlet terminals;
   a pressure-resistant main housing for enclosing said pyrometer;
   an insert removably mounted in the front wall of said main housing and located optically in front of said pyrometer, said insert comprising a radiation inlet and a window in the form of a germanium disc mounted in said inlet;
   sealing and clamping means for pressure-resistant mounting of said disc in said insert and of said insert in said front wall; and
   pressure-resistant openings in said housing for receiving inlet power cables and said pyrometer circuit outlet terminals;
   said pyrometer output circuit being designed such that the short-circuit current intensity across said outlet terminals is limited to a maximum of 50 milli-amperes.

2. The device of claim 1, wherein said insert further comprises a seat for receiving said germanium disc, and said sealing and clamping means comprises at least one sealing ring on each face of said disc and a screw-threaded thrust ring for securing said disc in position in said insert.

3. The device of claim 1, further comprising a non-pressure-resistant instrument housing attached to said main housing such that said pyrometer outlet terminals project into said instrument housing, and an indicator mounted within said instrument housing and having input terminals coupled to said pyrometer circuit outlet terminals.

4. The device of claim 1, further comprising a pressure-resistant mains junction box attached to said main housing and having pressure-resistant cable inlets and outlets.

* * * * *